(12) United States Patent
Rush et al.

(10) Patent No.: US 8,303,266 B2
(45) Date of Patent: Nov. 6, 2012

(54) MOUNTING FLANGE, PUMP HAVING MOUNTING FLANGE AND MOLD FOR MOUNTING FLANGE

(75) Inventors: Eric W. Rush, Manchester, MO (US); Donald E. Morgan, Florissant, MO (US)

(73) Assignee: Nidec Motor Corporation, St. Louis, MO (US)

( * ) Notice: Subject to any disclaimer, the term of this patent is extended or adjusted under 35 U.S.C. 154(b) by 1158 days.

(21) Appl. No.: 12/133,096

(22) Filed: Jun. 4, 2008

(65) Prior Publication Data

US 2009/0060763 A1    Mar. 5, 2009

Related U.S. Application Data

(60) Provisional application No. 60/969,413, filed on Aug. 31, 2007.

(51) Int. Cl.
*F04B 17/03* (2006.01)
*F04B 35/04* (2006.01)
*H02K 5/04* (2006.01)

(52) U.S. Cl. .................. 417/360; 417/423.15; 310/89; 310/91

(58) Field of Classification Search ............... 310/89, 310/91; 417/360, 423.15
See application file for complete search history.

(56) References Cited

U.S. PATENT DOCUMENTS

| | | | |
|---|---|---|---|
| 3,787,014 A * | 1/1974 | Story et al. | 248/558 |
| 5,451,139 A | 9/1995 | Tadiello | |
| 6,056,506 A | 5/2000 | Marten et al. | |
| 6,270,680 B1 * | 8/2001 | Silveri et al. | 210/746 |
| 2008/0159883 A1 * | 7/2008 | Finkenbinder et al. | 417/360 |

* cited by examiner

*Primary Examiner* — Devon Kramer
*Assistant Examiner* — Bryan Lettman
(74) *Attorney, Agent, or Firm* — Senniger Powers LLP

(57) ABSTRACT

A mounting structure for mounting a device to an electric motor having an output shaft has a body including an opening for receiving the output shaft through the body. A plurality of connector elements are supported by the body. The mounting structure includes a plurality of threaded inserts. Each of these inserts is inserted in one of the connector elements for receiving a fastener to connect the body to the motor. Each connector element is sized and shaped for alternatively receiving an insert in at least two, non-coincident locations. The mounting structure can be combined with an electric motor to produce an electric motor assembly that can be mounted on a pump or other device so the device is powered by the motor.

15 Claims, 13 Drawing Sheets

MOUNTING FLANGE, PUMP HAVING MOUNTING FLANGE AND MOLD FOR MOUNTING FLANGE

RELATED APPLICATION

This application claims priority to U.S. Provisional Patent Application No. 60/969,413, filed on Aug. 31, 2007, entitled, "Mounting Flange, Pump having Mounting Flange and Mold for Mounting Flange", which is incorporated herein by reference to the extent permitted by law.

FIELD

The present application relates to mounting structures such as those used to mount pumps to motors, and more particularly to mounting structures capable of being mounted to motors having different configurations that may be molded using a single reconfigurable mold.

BACKGROUND

Pumps and other devices may be powered by motors connected to the devices. The devices are usually connected to the motors by screw fasteners. Sometimes a common pump may be used with motors having differing fastener configurations. For example, a common pump may be used with motors made by different manufacturers or with different size motors. Because different motors have different fastener configurations, pumps having different fastener configurations must also be made. Substantially identical pumps having different fastener configurations may be needed to connect to different motors. Producing and stocking similar pumps having different fastener configurations adds to product cost.

Among other reasons for increased pump cost, different fastener configurations sometimes require different molds to make the different pumps. Because molds typically are expensive to manufacture, a need exists for a mold that can make pumps and devices having different fastener configurations.

SUMMARY

In one aspect, the present invention includes a mounting structure for mounting a device to an electric motor having an output shaft. The mounting structure comprises a body including an opening for receiving the output shaft through the body and a plurality of connector elements supported by the body. Further, the mounting structure includes a plurality of threaded inserts. Each of the inserts is inserted in one of the connector elements for receiving a fastener to connect the body to the motor. Each connector element is sized and shaped for alternatively receiving an insert in at least two, non-coincident locations within the connector element.

In another aspect, the present invention includes a mold for forming a mounting structure for use in mounting an electric motor. The mounting structure includes a connector element and an insert inserted in the connector element in one of at least two non-coincident locations. The mold comprises a first mold member and a second mold member adapted for selectively mating with the first mold member to form a mold cavity sized and shaped for forming the mounting structure having the connector element positioned thereon. The mold also includes a mold sub-insert selectively attachable to the second mold member for forming a cavity in the connector element for receiving the insert. The sub-insert is positionable in at least two non-coincident positions relative to the second mold member for selectively forming the receptacle in a corresponding one of at least two non-coincident locations on the connector element.

In still another aspect, the present invention includes an electric motor assembly comprising an electric motor having an output shaft and an end having an alignment feature formed thereon. The assembly also includes a mounting structure comprising a body including an opening for receiving the output shaft through the body and a plurality of connector elements mounted on the body for connecting the mounting structure to the motor. The mounting structure also includes an alignment feature on the body adapted to engage the alignment feature formed on the end of the motor for maintaining alignment between the mounting structure and the electric motor.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF DRAWINGS

Corresponding reference characters indicate corresponding parts throughout the several views of the drawings.

DETAILED DESCRIPTION

Figure 1:
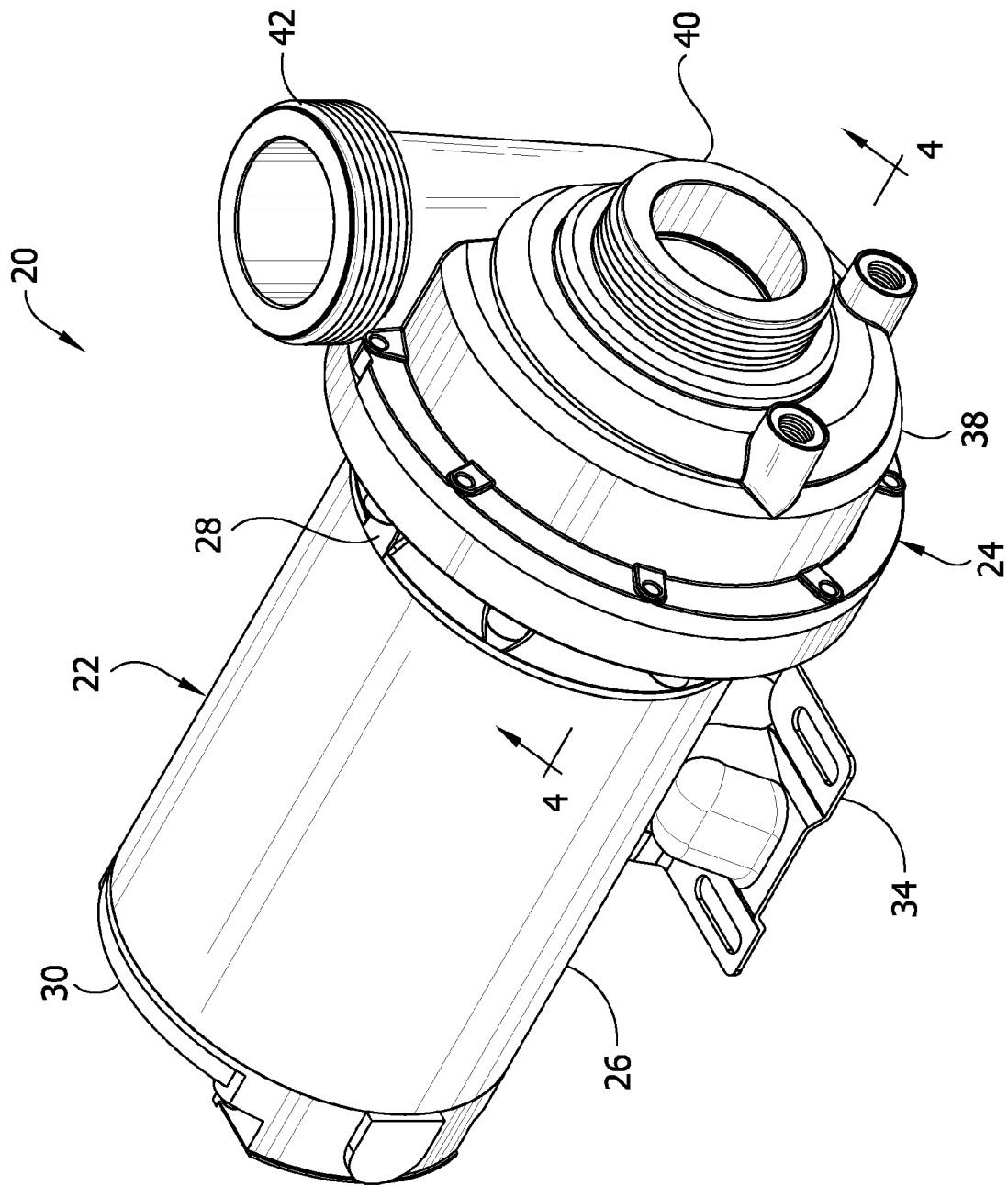
FIG. 1 is a perspective of an electric pump assembly.
Figure 2:
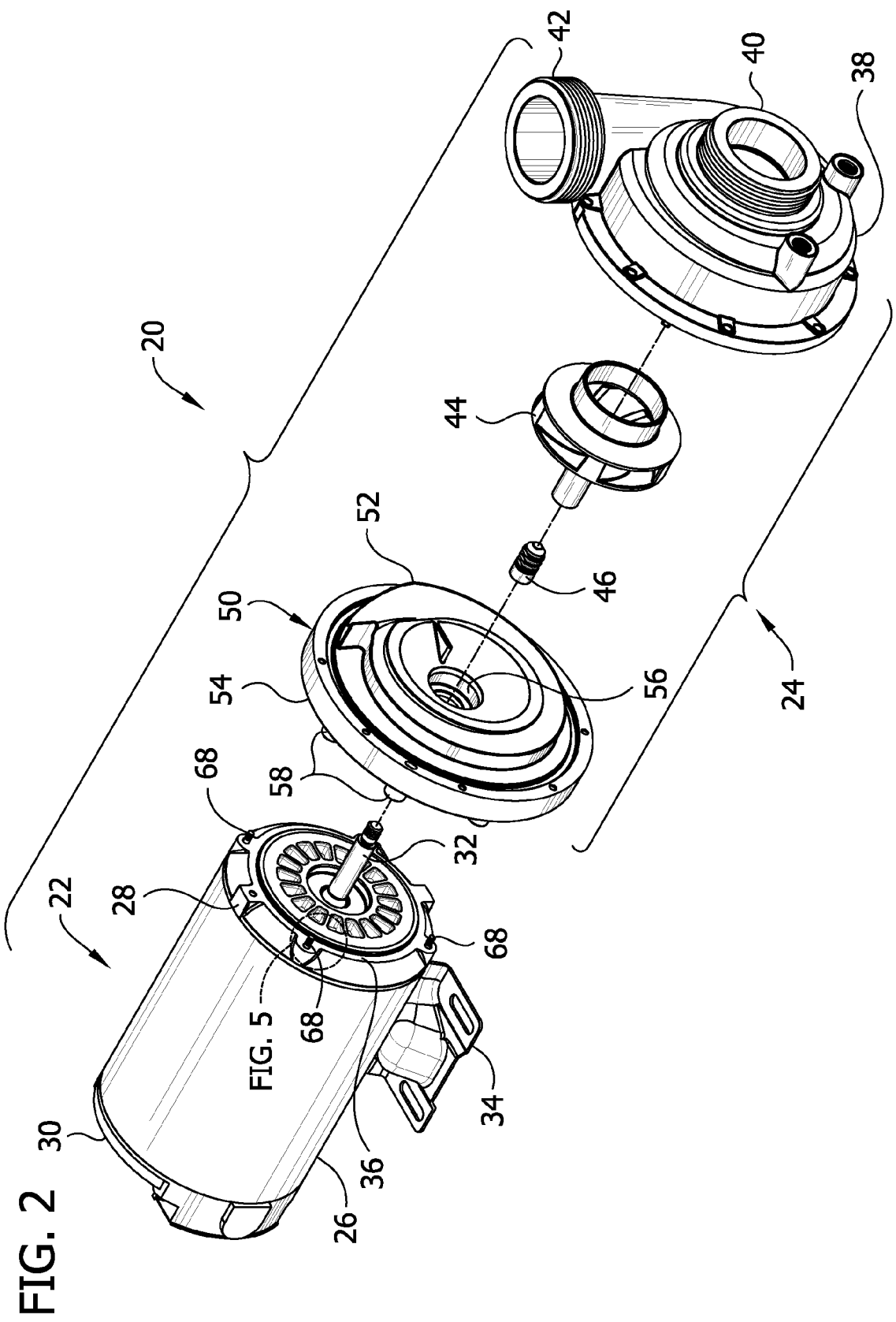
FIG. 2 is a perspective of the pump assembly partially separated.

Referring to FIG. 1, an electric pump assembly of the present invention is designated in its entirety by the reference number 20. The assembly 20 includes an electric motor, generally designated by 22, and a centrifugal pump, generally designated by 24. As illustrated in FIG. 2, the electric motor 22 includes a generally cylindrical case 26, a front endshield 28 at one end of the case, a back endshield 30 at an end of the case opposite the front endshield, and a selectively rotatable drive shaft 32 projecting through the front endshield. In the illustrated embodiment, the electric motor includes a bracket 34 for attaching the motor 22 to a support on a larger apparatus such as a spa tub. As will be appreciated by those skilled in the art, the drive shaft 32 rotates about its imaginary longitudinal axis when electricity is supplied to the motor 22. A shoulder 36 is provided on the front endshield 28 of the motor 22 for centering the pump 24 on the shaft 32. Because the electric motor 22 is conventional, it will not be described in further detail.

Figure 3:
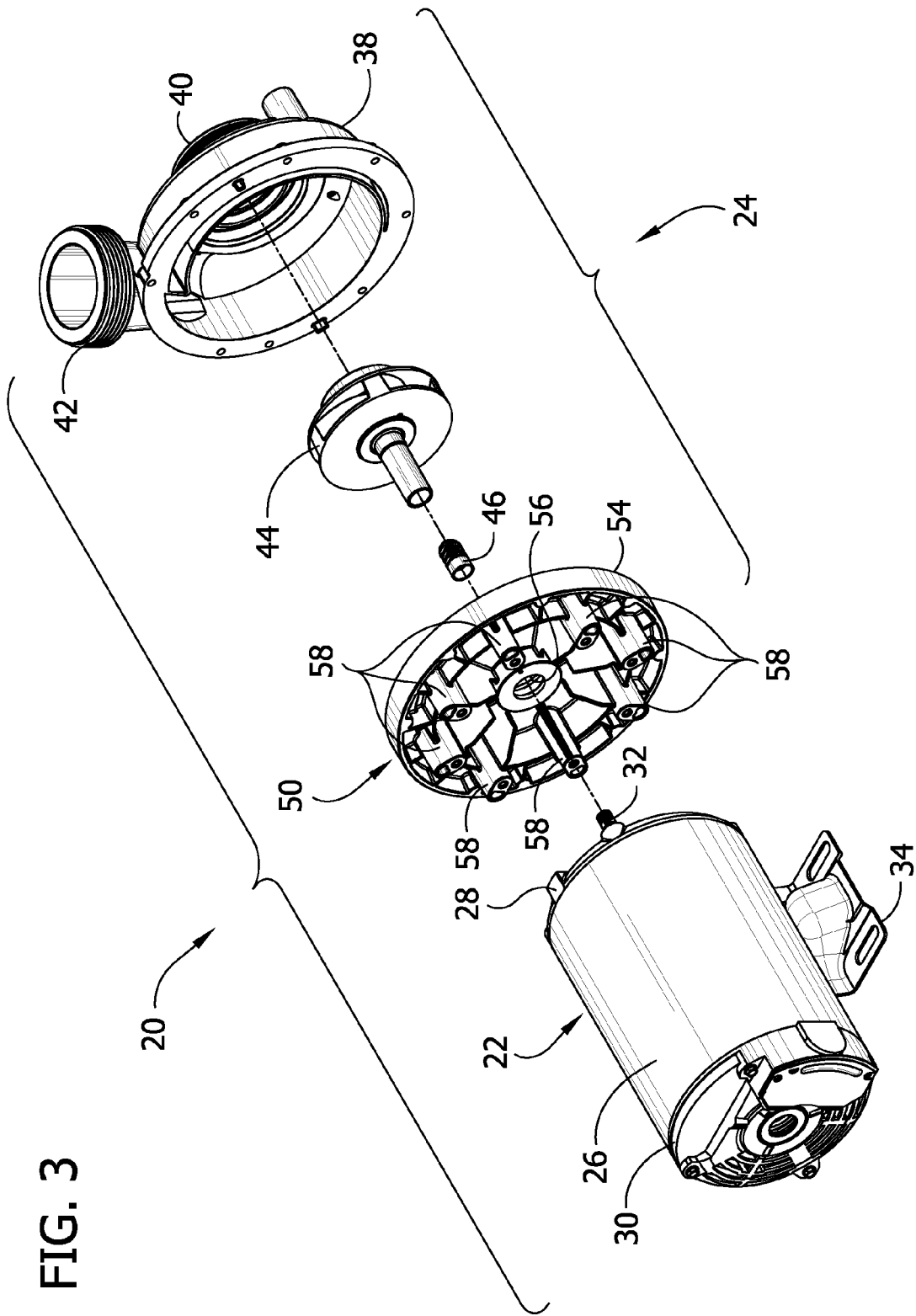
FIG. 3 is an alternate perspective of the assembly shown partially separated.

As shown in FIGS. 2 and 3, the centrifugal pump 24 includes a primary enclosure or housing 38 having a threaded inlet port 40 and a threaded outlet port 42, each of which is adapted to be attached to conduits (not shown) for transporting fluid to and from the pump. The enclosure 38 houses an impeller 44 that is operatively connected to the drive shaft 32 of the motor 22. In one embodiment, the impeller 44 is connected to the drive shaft 32 by a coupling 46 so the impeller turns with the drive shaft. As the impeller 44 turns, it draws fluid into the pump 24 through the inlet port 40 and expels fluid out of the pump through the outlet port 42.

As further illustrated in FIG. 2, the pump 24 includes a mounting structure, generally indicated at 50, having a volute body 52 surrounding by a flange 54. In one embodiment, the mounting structure 50 is molded as a single piece of polymeric material but may be formed as several pieces and joined together. For example, the volute body 52 may be formed separately from the flange 54 and assembled to the flange with fasteners or adhesive. Although the pump 24 is illustrated as being a centrifugal pump, those skilled in the art will appreciate that the pump may be another type without departing from the scope of the present invention. Moreover, those skilled in the art will appreciate that the principles of the present invention may be applied to motors attached to devices other than pumps.

As shown in FIG. 3, the flange 54 of the mounting structure 50 is generally circular. Further, the mounting structure 50 includes a central opening 56 allowing the drive shaft 32 of the motor 22 to pass through the mounting structure to the pump impeller 44. The mounting structure 50 also includes a plurality of connector bosses or elements 58 spaced angularly around the central opening 56 for connecting the flange to the motor 22. The connector elements 58 are joined by an annular wall 60 and supported by radial ribs 62. One or more of these ribs 62 may include a notch 64 for engaging the shoulder 36 on the motor 22 front endshield 28 to center the mounting structure 50 on the motor. In one embodiment, each connector element 58 has a generally racetrack-shaped cross section and projects axially outward from the mounting structure 50 in a direction opposite the volute body 52.

Figure 4:
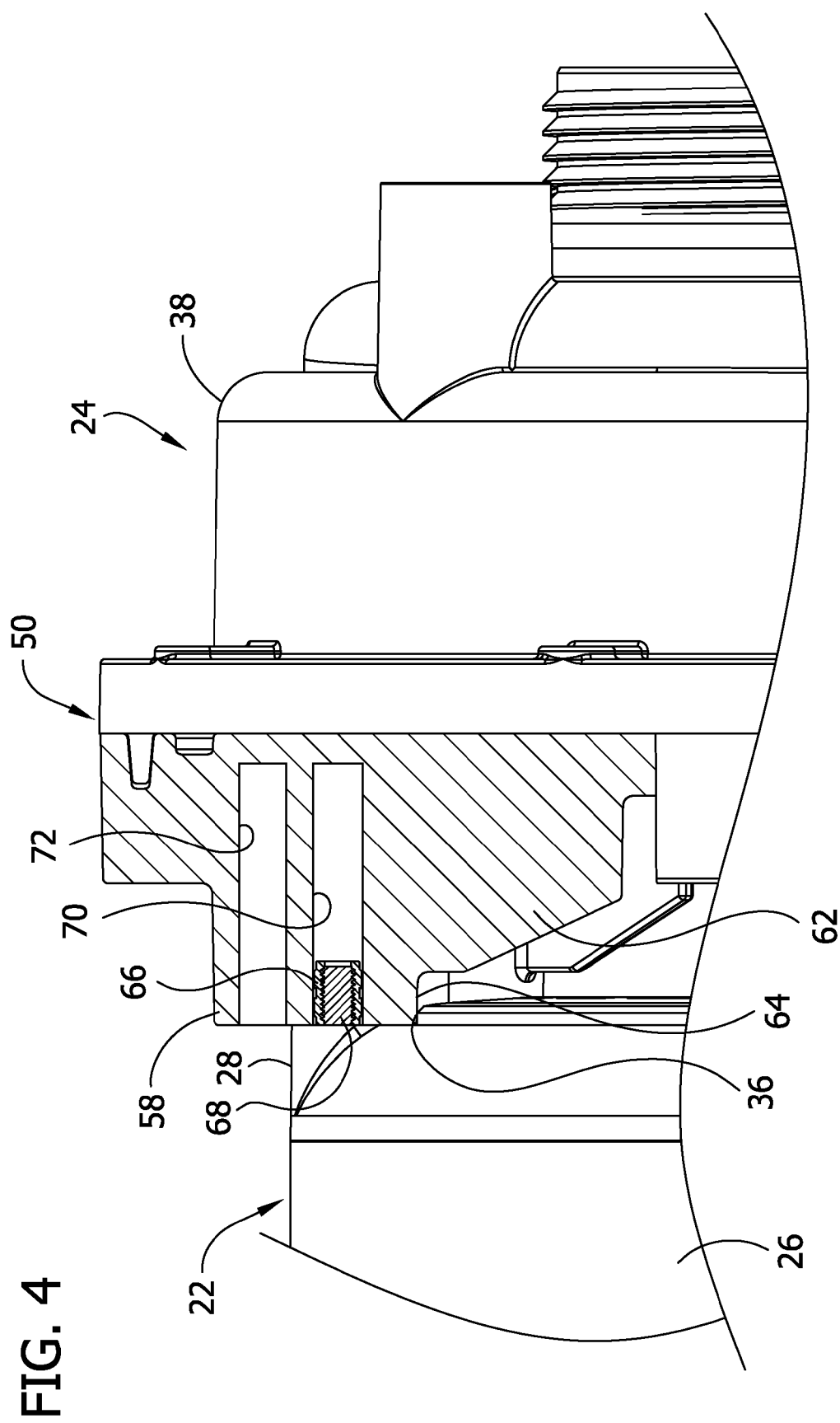
FIG. 4 is a fragmentary side elevation of the assembly showing a mounting structure in partial section taken along line 4-4 in FIG. 1.
Figure 5:
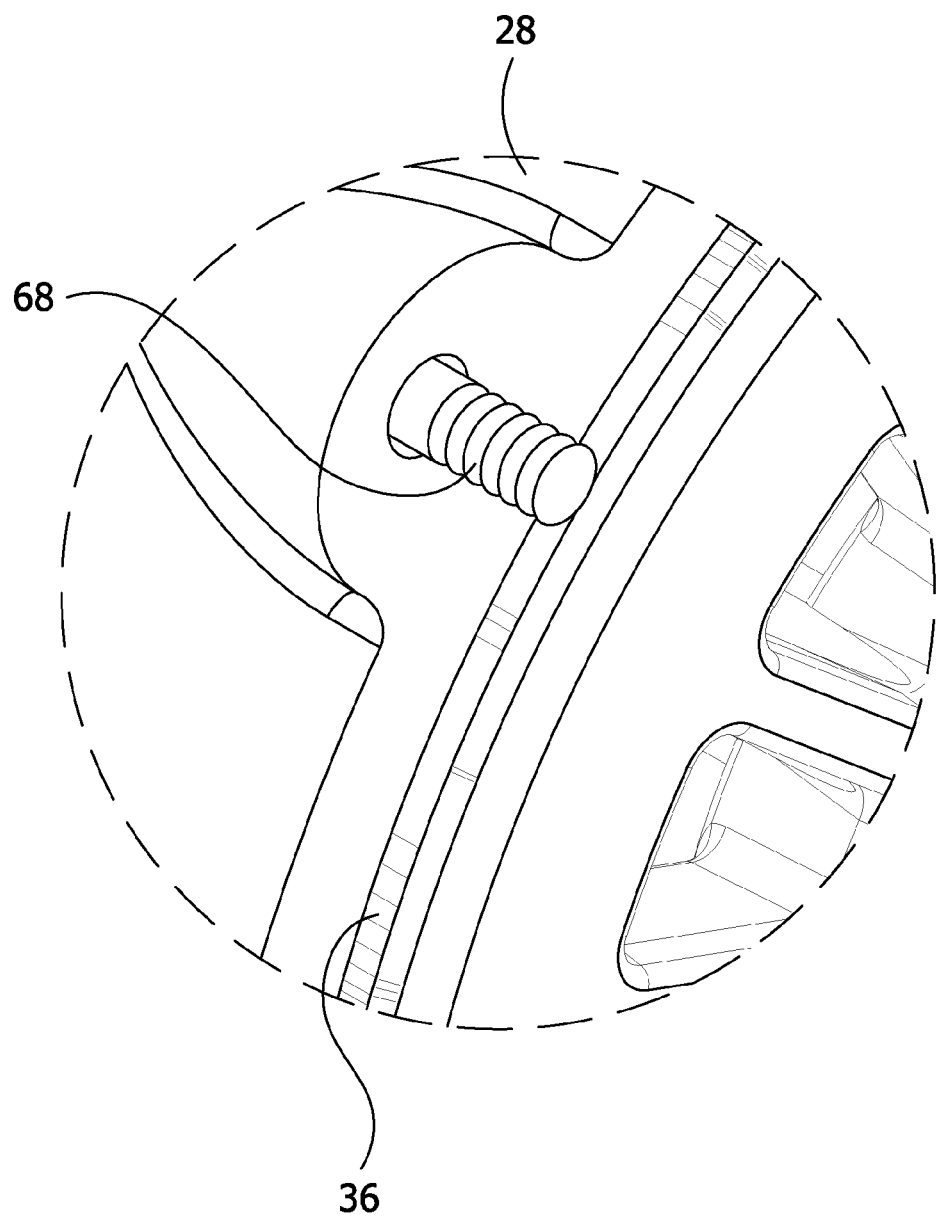
FIG. 5 is a detail of an endshield of an electric motor of the assembly as indicated in FIG. 2.

Referring to FIG. 4, the connector elements 58 are each adapted to receive an insert 66 made of a material having sufficient strength to resist damage from fastener loading. Although the insert 66 may be made from other materials without departing from the scope of the present invention, in one embodiment each insert is made of brass suitable for retaining a fastener 68. For example, in one particular embodiment the fastener 68 received by the insert 66 is a threaded bolt or stud as shown in FIG. 5. Further, in one embodiment the insert 66 includes a rough (e.g., knurled or fluted) exterior to improve interface shear strength with the connector elements 58. Inserts 66 having other configurations (not shown) may be used without departing from the scope of the present invention. More particularly, the connector elements 58 are formed with cylindrical cavities 70 sized to receive the threaded inserts 66 and retain them in the cavities. For example, in one embodiment the cavities 70 are sized to have an interference fit with the inserts 66 so the inserts may be pressed into place. In another embodiment, the inserts 66 are molded into the connector elements 58. In still another embodiment, it is envisioned that the inserts 66 may be adhesively bonded in position.

Figure 6:
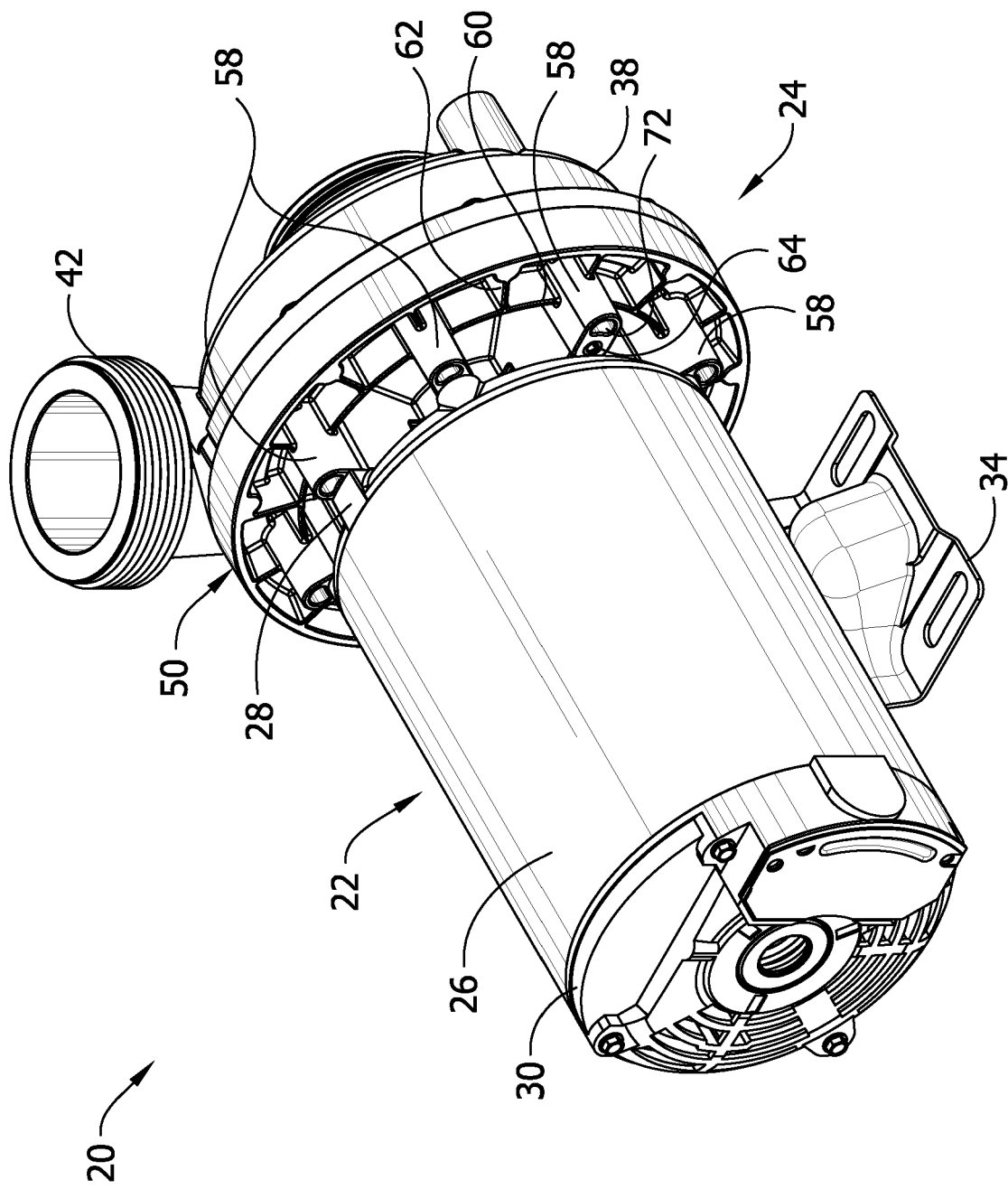
FIG. 6 is an alternate perspective of the electric pump assembly.
Figure 7:
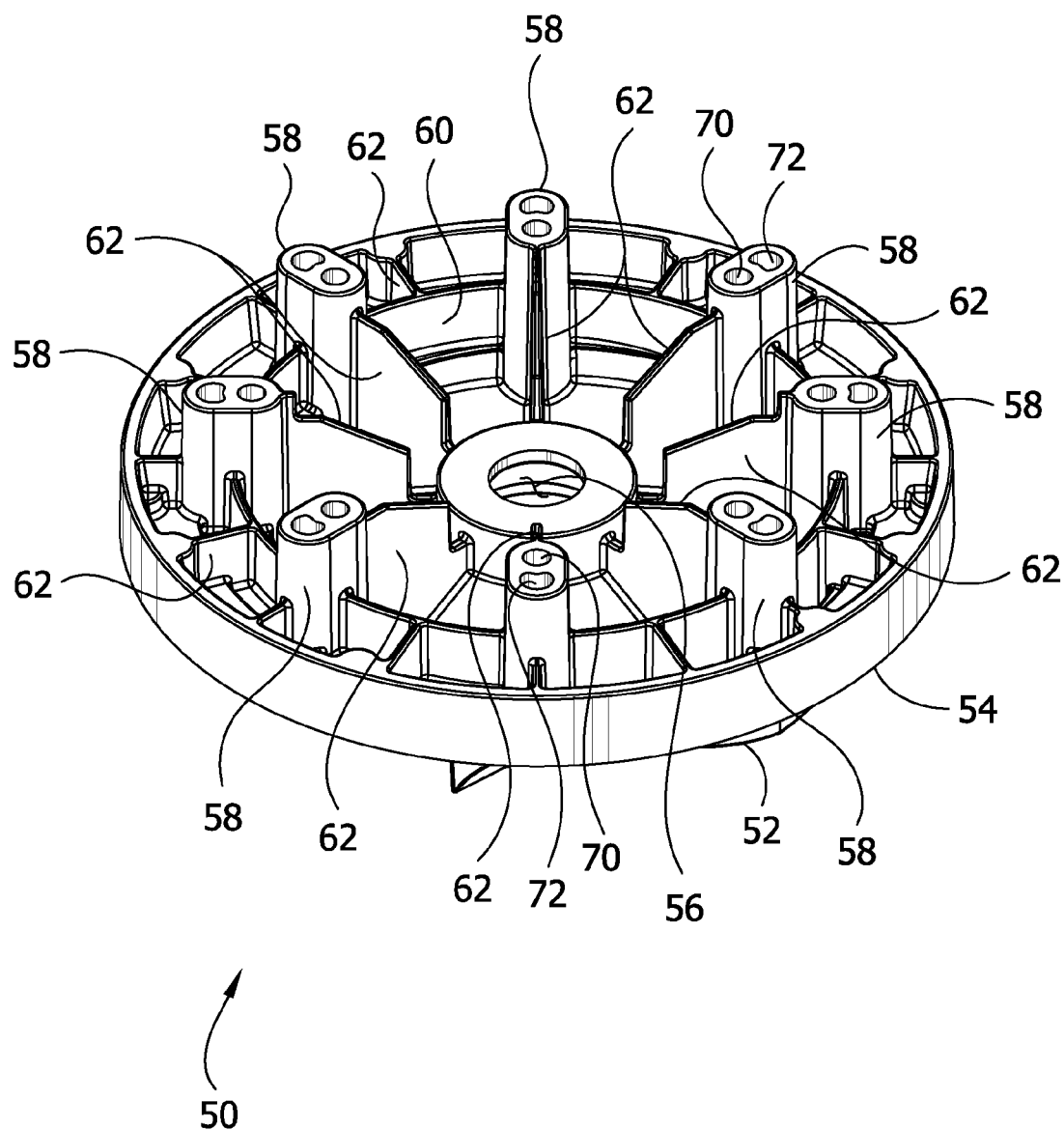
FIG. 7 is a perspective of a mounting structure of a first embodiment without inserts.

As illustrated in FIG. 6, each connector element 58 has a void 72 to reduce the amount of material needed to form the connector element. As further shown in FIGS. 7 and 8, the voids 72 are shaped on their sides adjacent the cavities 70 so that the walls separating the voids and the corresponding cavities have a generally constant thickness. Thus, the voids 72 have an overall crescent-shaped cross section. Other configurations of cavities and voids may be used without departing from the scope of the present invention. In one embodiment, the voids 72 could be omitted entirely.

Different motors 22 may have different fastener positions. The shape of the connector elements 58 permits the mounting structure 50 to be easily molded in more than one configuration for mounting the same centrifugal pump 24 to different motors 22 having different fastener positions. For example, the motors 22 may have different fastener diameters, different radial fastener positions or different circumferential fastener spacing, but the pump itself would have a similar internal configuration.

Figure 10:
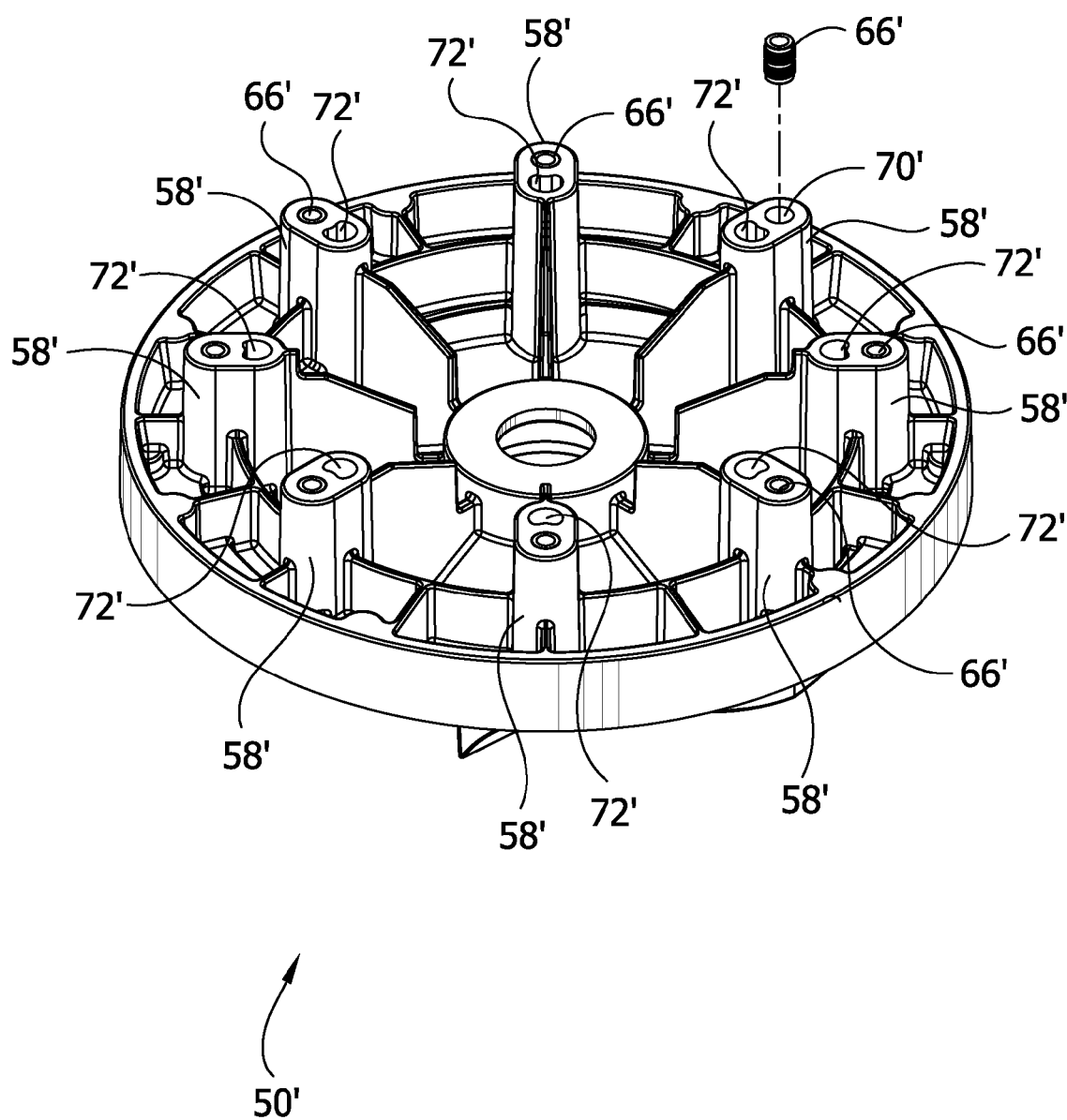
FIG. 10 is the perspective of a mounting structure of a second embodiment having one threaded insert separated from the structure, the alternate perspective being identical to FIG. 9.

In a second embodiment illustrated in FIG. 10, the connector elements 58' could be arranged to connect to different motors 22 having similar circumferential fastener spacing but different radial fastener positions. The cavities 70' for receiving the threaded inserts 66' can be disposed on the radially outer ends, and the voids 72' on the radially inner ends of the connector elements 58'. The construction of the mounting structure 50' of FIG. 10 is identical to the mounting structure 58 of FIGS. 6-8, except for the location of the cavities 70' and the voids 72', which are reversed from the location of the cavities 70 and voids 72 of the first embodiment. The parts of the mounting structure 50' of FIG. 10 will be given the same reference numerals as the mounting structure 50, but with the addition of a trailing prime ('). The mounting structure 50' is constructed for receiving mounting bolts (not shown) located radially farther outward than the bolts 66 that are received by the mounting structure 50 of FIGS. 6-8. Moreover, the threaded inserts 66' have a different inner diameter for receiving a different diameter fastener. The outside diameter of the threaded inserts 66' is the same as that of the threaded inserts 66 of the first embodiment so the same size cavities 70' are used in both embodiments.

Figure 8:
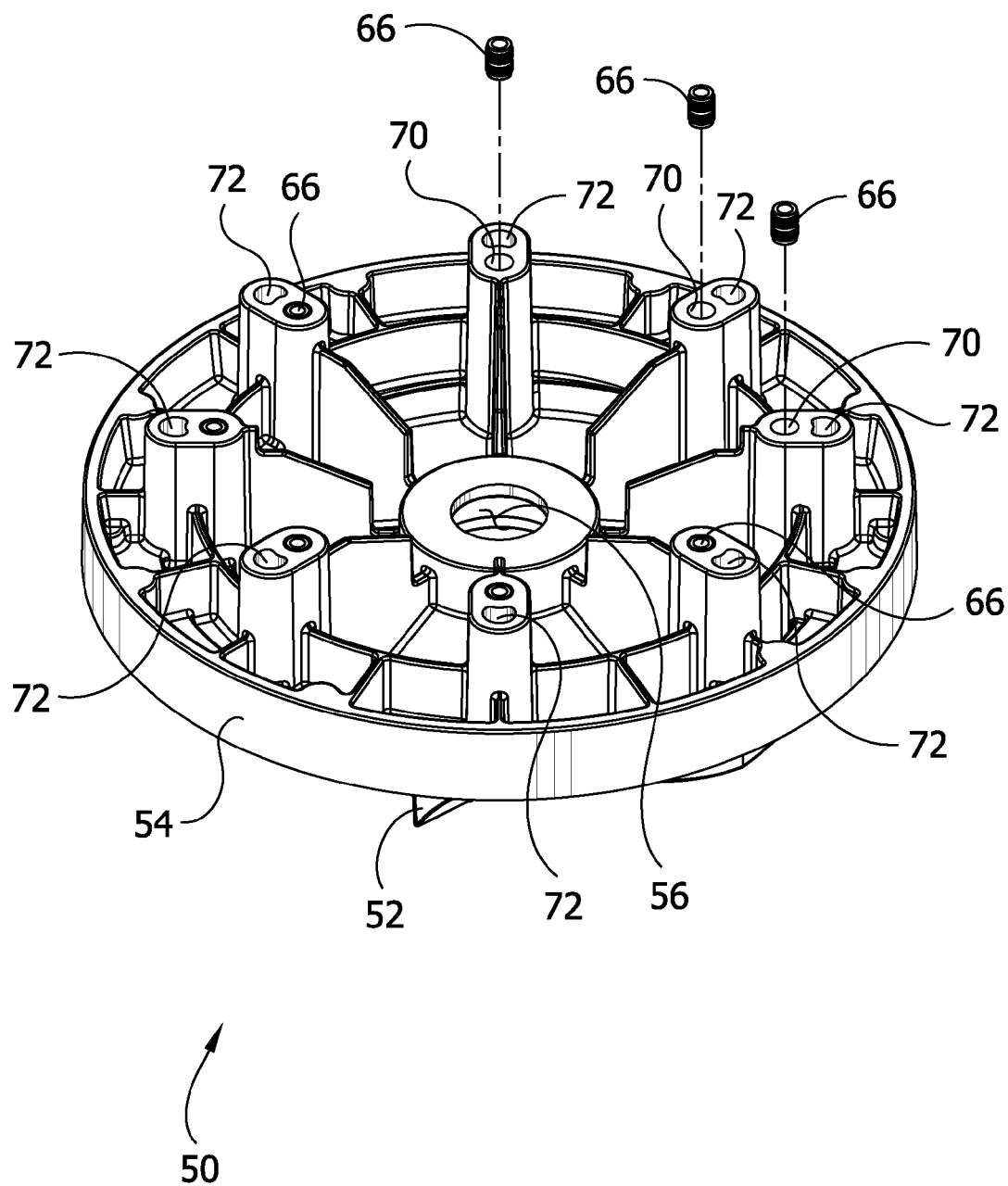
FIG. 8 is the perspective of the mounting structure of the first embodiment showing threaded inserts removed from the mounting structure.
Figure 9:
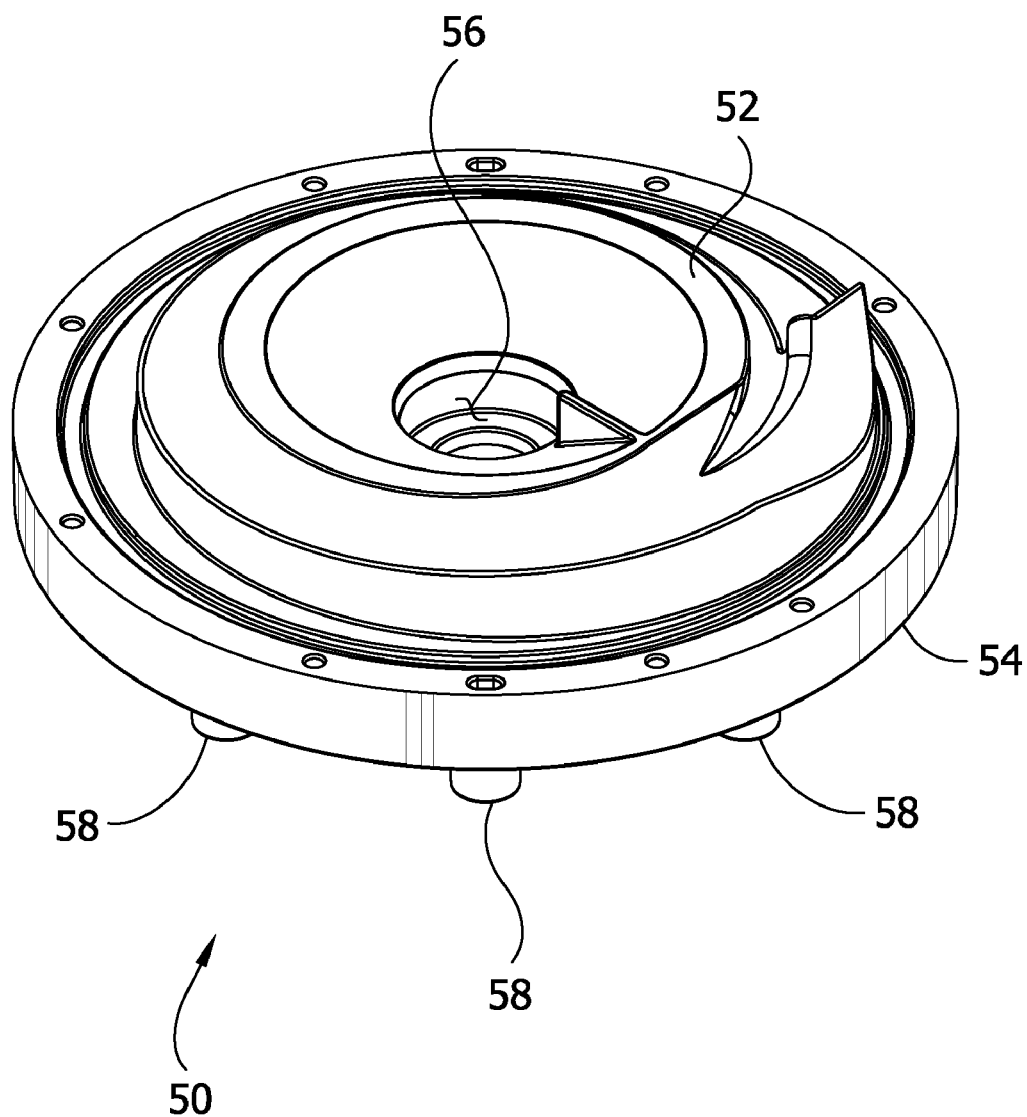
FIG. 9 is an alternate perspective of the mounting structure of the first embodiment.
Figure 11:
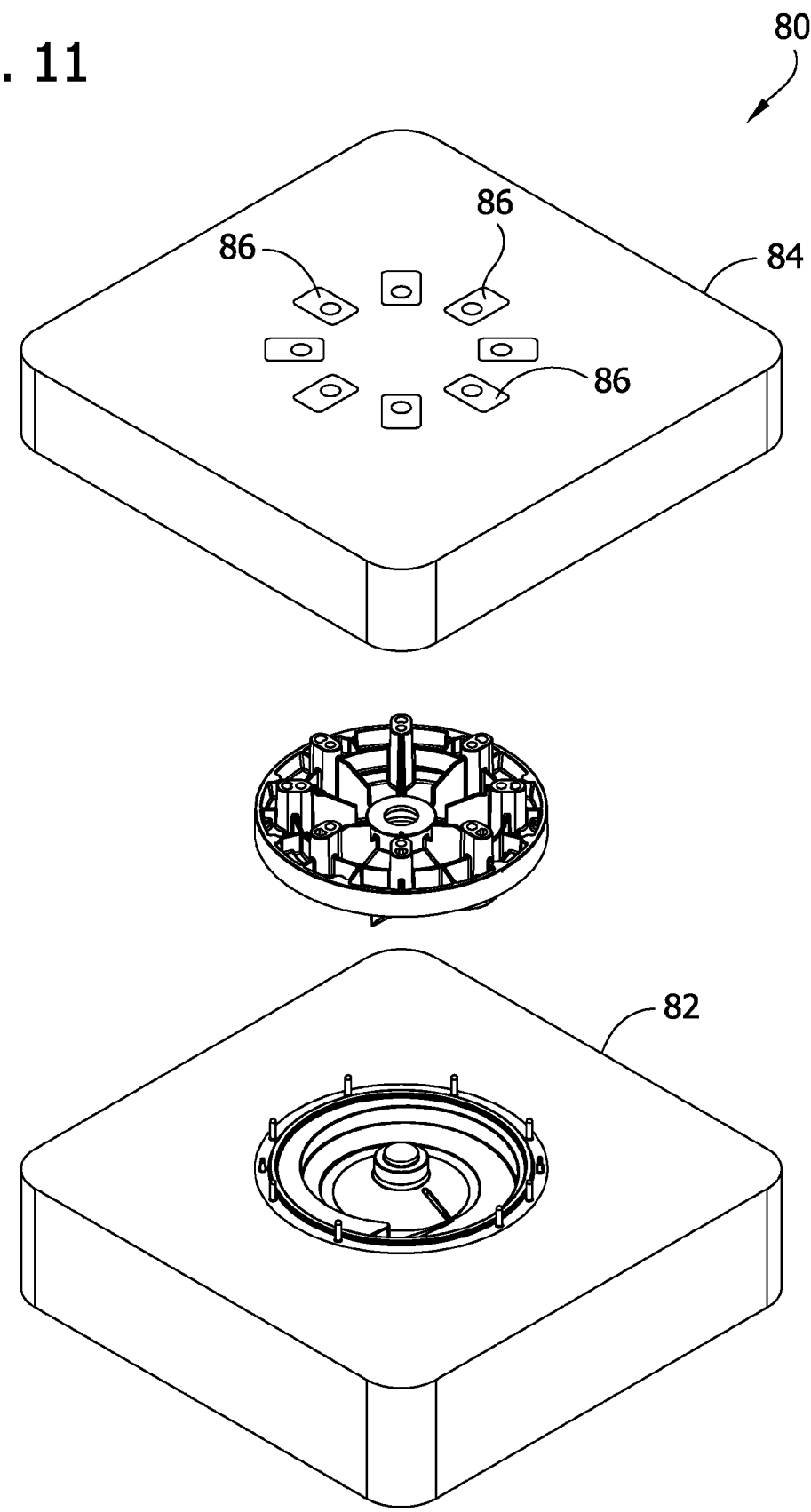
FIG. 11 is a perspective of a mold for making the mounting structure of either embodiment.
Figure 12:
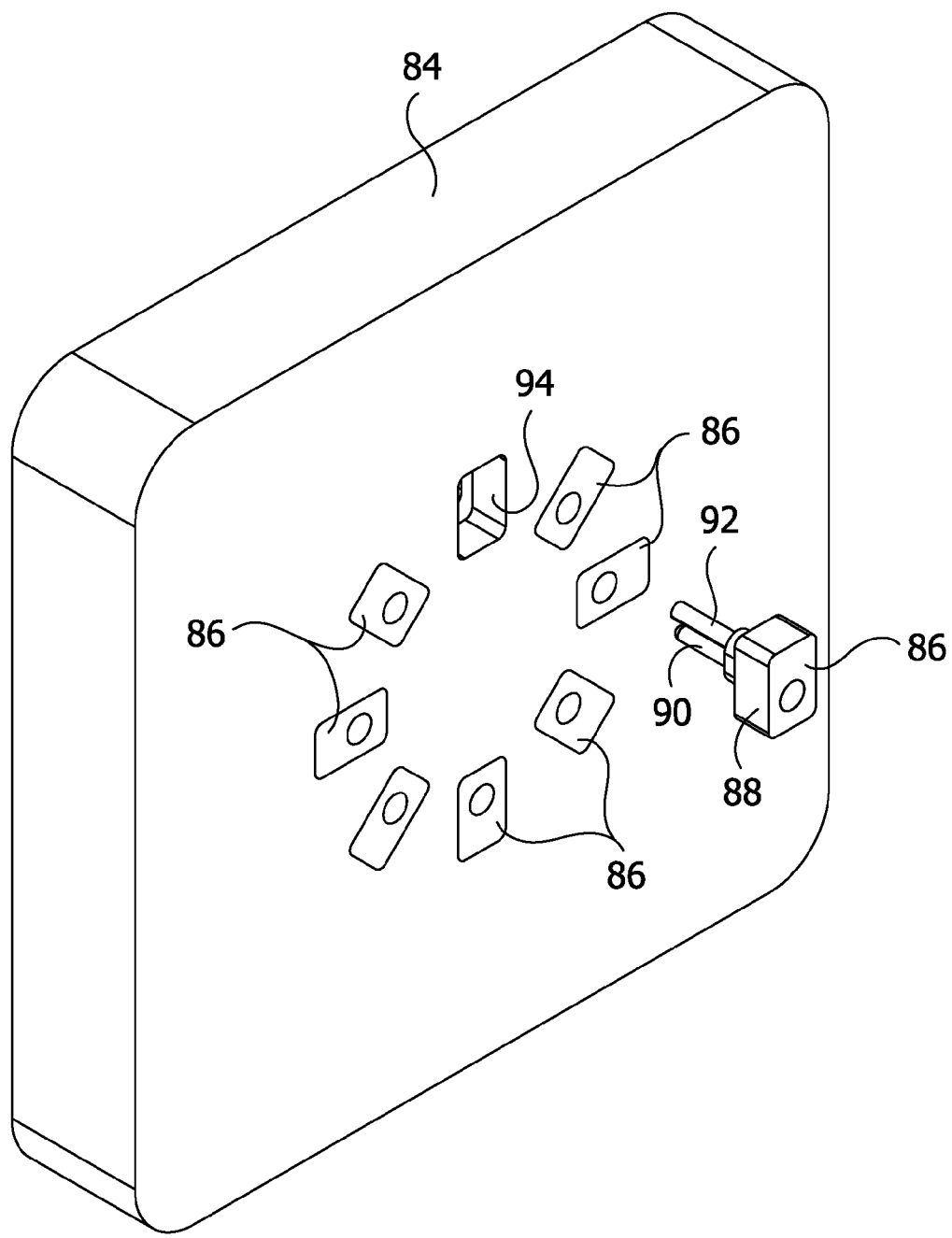
FIG. 12 is a perspective of an upper mold member showing a sub-insert of the mold separated from the mold member and oriented for forming the mounting structure of the first embodiment.
Figure 13:
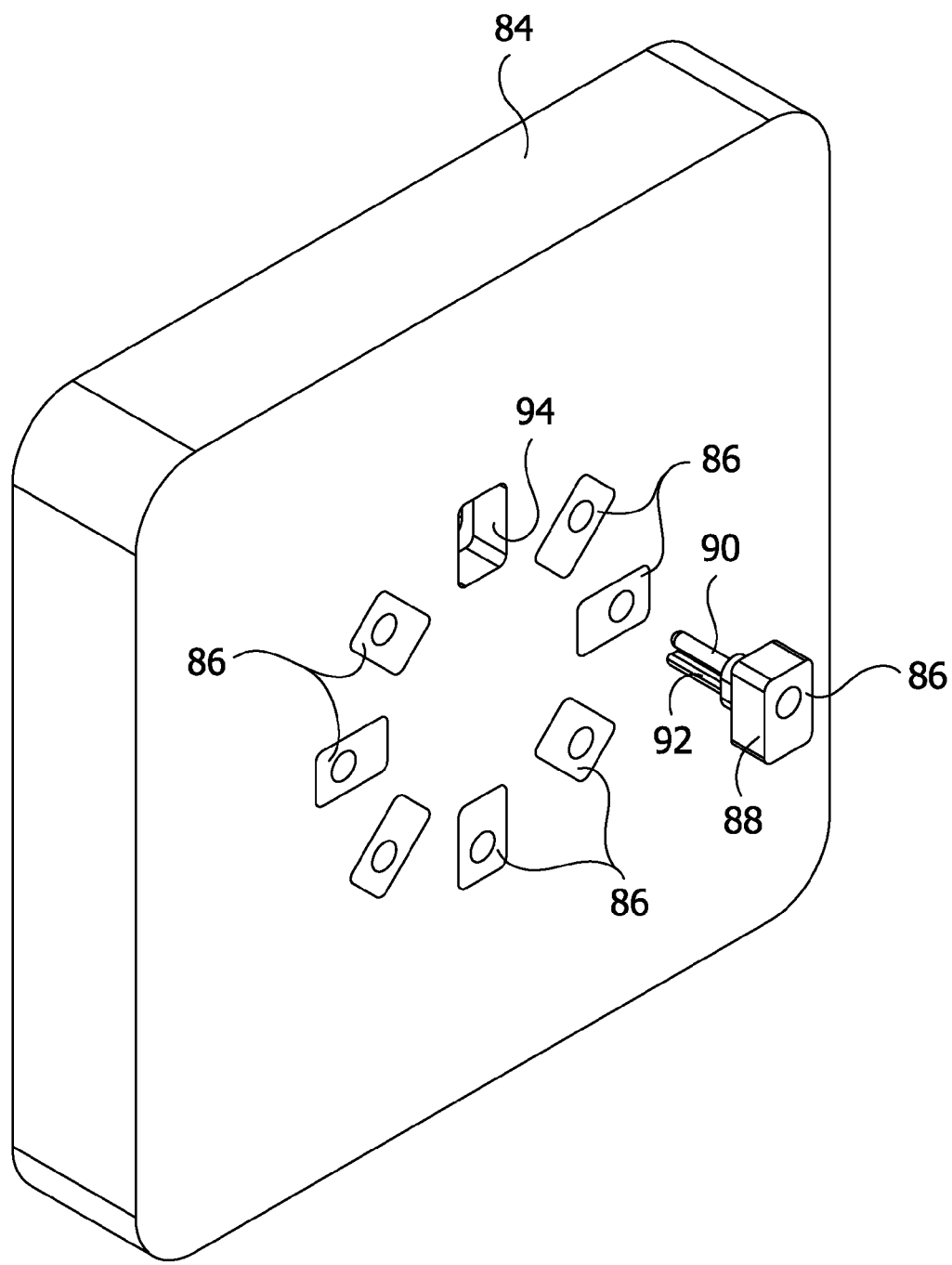
FIG. 13 is the perspective of FIG. 12 showing the sub-insert separated from the mold member and oriented for forming the mounting structure of the second embodiment.

The mounting structures 50, 50' having different threaded insert cavity 70, 70' and void 72, 72' positions can be formed in the same mold, generally designated 80 in FIGS. 11-13. The mold 80 includes a first mold member 82 and a second mold member 84 that are joined and separated as known to those of ordinary skill in the art. The first mold member 82 is formed to shape the volute 50, 50' and the second member 84 is formed to create the opposite side of the mounting structure 50, 50' including the connector elements 58, 58'. The second mold member includes sub-inserts 86 that can be used to form both the connector elements 58 of FIGS. 1-7 and the connector elements 58' of FIG. 8. The sub-inserts 86 comprise a stepped base 88, a cavity core 90 and a void core 92. The cavity core 90 and void core 92 both project from the base. The cavity core 90 has a generally cylindrical shape, and the void core 92 has a roughly crescent shape, corresponding to the shape of the cavity 68, 68' and void 70, 70', respectively. Each sub-insert 86 is releasably mountable on the second mold member 84 so that the sub-insert can be removed through the back of the second mold member as shown in FIG. 12. It is envisioned that the cores 90, 92 may be replaced with other cores (not shown) having different configurations. The base 88 is generally rectangular in shape with rounded corners, and is received in a correspondingly rectangular aperture 94 in the second mold member 84. It will be appreciated that the base 88 can be received in one of two positions in the aperture 94 of the second mold member. In a first of these positions illustrated in FIG. 12, the sub-insert 86 is arranged so that the cavity core 90 is located radially inward from the void core 92 for forming the mounting structure 50 as shown in FIG. 8. In the second position illustrated in FIG. 13, the sub-insert is arranged so that the cavity core 90 is located radially outward from the void core 92 for forming the mounting structure 50' as shown in FIG. 10. Thus, it may be seen that by simply detaching the sub-insert 86, rotating it and reinserting the sub-insert into the second mold member 84, the second mold member can be converted to selectively produce either the mounting structure 50 of the first embodiment or the mounting structure 50' of the second embodiment. No separate sub-insert is required.

The previously described shoulder 36 and notched ribs 62 engage each other to align the shaft 32 of the motor 22 with the pump 24. These features prevent the shaft 32 and pump 24 from becoming misaligned which can damage seals in the pump. These features are particularly advantageous when the electric pump assembly 20 is jarred during transport.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that several advantages are achieved by the present invention.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A mounting structure for mounting a device to an electric motor having an output shaft, the mounting structure comprising:
    a body including an opening for receiving the output shaft through the body,
    a plurality of connector elements supported by the body; and
    a plurality of threaded inserts, each insert of said plurality of inserts being inserted in a cavity of one of said plurality of connector elements for receiving a fastener to connect the body to the motor;
    wherein each connector element has a hollow interior partitioned into the cavity and a void, and wherein the hollow interior can be alternatively partitioned for receiving a single insert in at least two, non-coincident locations within the hollow interior.

2. The mounting structure as set forth in claim 1 wherein:
    the motor includes a raised shoulder surrounding the output shaft; and
    the body includes an element sized, shaped and positioned for engaging the raised shoulder on the motor for locating the output shaft relative to the device.

3. The mounting structure as set forth in claim 1 wherein each of said plurality of connector elements includes the void adjacent the insert for reducing material.

4. The mounting structure as set forth in claim 1 further comprising a support for supporting each of said connector elements on the body.

5. The mounting structure as set forth in claim 4 wherein the support includes a radially extending rib.

6. The mounting structure as set forth in claim 4 wherein the support includes a circumferentially extending wall.

7. The mounting structure as set forth in claim 1 wherein the body includes a volute body and the mounting structure further comprises:
    an impeller connected to the output shaft; and
    a pump housing surrounding the impeller and connected to the body.

8. The mounting structure as set forth in claim 7 wherein the body includes a flange adapted for connecting the body to the pump housing.

9. An electric motor assembly comprising:
    an electric motor having an output shaft and an end;
    a mounting structure comprising:
        a body including an opening for receiving the output shaft through the body;
        a plurality of connector elements mounted on the body for connecting the mounting structure to the motor; and
    a plurality of threaded inserts, each of said inserts being inserted in a cavity of one of said plurality of connector elements for receiving a fastener to connect the body to the motor, wherein each connector element has a hollow interior partitioned into the cavity and a void, and wherein the hollow interior can be alternatively partitioned for receiving a single insert in at least two, non-coincident locations within the hollow interior.

10. The electric motor assembly as set forth in claim 9 wherein:
    the end of the electric motor has an alignment feature formed thereon; and
    the mounting structure has an alignment feature on the body adapted to engage the alignment feature formed on the end of the motor for maintaining alignment between the mounting structure and the electric motor.

11. The electric motor assembly as set forth in claim 10 wherein the motor alignment feature includes a raised shoulder surrounding the output shaft.

12. The electric motor assembly as set forth in claim 11 wherein the body alignment feature includes a notch sized, shaped and positioned for engaging the raised shoulder on the motor for aligning the mounting structure and the electric motor.

13. The electric motor assembly as set forth in claim 10 wherein each of said plurality of connector elements includes the void adjacent the insert for reducing material.

14. The electric motor assembly as set forth in claim 10 wherein the body includes a volute body and the structure further comprises:
    an impeller connected to the output shaft; and
    a pump housing surrounding the impeller and connected to the body.

15. The electric motor assembly as set forth in claim 14 wherein the body includes a flange adapted for connecting the body to the pump housing.

* * * * *